(12) United States Patent
Sakurai et al.

(10) Patent No.: US 11,916,235 B2
(45) Date of Patent: Feb. 27, 2024

(54) FLUORIDE ION SECONDARY BATTERY

(71) Applicant: HONDA MOTOR CO., LTD., Tokyo (JP)

(72) Inventors: Katsutoshi Sakurai, Saitama (JP); Yoshiyuki Morita, Saitama (JP)

(73) Assignee: HONDA MOTOR CO., LTD, Tokyo (JP)

( * ) Notice: Subject to any disclaimer, the term of this patent is extended or adjusted under 35 U.S.C. 154(b) by 100 days.

(21) Appl. No.: 17/583,232

(22) Filed: Jan. 25, 2022

(65) Prior Publication Data

US 2022/0238876 A1 Jul. 28, 2022

(30) Foreign Application Priority Data

Jan. 26, 2021 (JP) ................... 2021-010584

(51) Int. Cl.
*H01M 4/00* (2006.01)
*H01M 4/58* (2010.01)
*H01M 4/38* (2006.01)
*H01M 10/0562* (2010.01)
*H01M 4/66* (2006.01)
*H01M 4/04* (2006.01)
*H01M 4/02* (2006.01)

(52) U.S. Cl.
CPC ......... *H01M 4/582* (2013.01); *H01M 4/0404* (2013.01); *H01M 4/38* (2013.01); *H01M 4/661* (2013.01); *H01M 10/0562* (2013.01); *H01M 2004/027* (2013.01); *H01M 2004/028* (2013.01); *H01M 2300/008* (2013.01)

(58) Field of Classification Search
CPC ............ H01M 4/582; H01M 2004/027; C01G 21/16; C01F 17/0031
See application file for complete search history.

(56) References Cited

U.S. PATENT DOCUMENTS

| 6,379,841 | B1 * | 4/2002 | Potanin | .................. H01M 4/06 429/219 |
| 2018/0159129 | A1 * | 6/2018 | Ide | ......................... C01F 17/36 |
| 2020/0185776 | A1 * | 6/2020 | Xu | ......................... H01M 4/62 |

FOREIGN PATENT DOCUMENTS

JP 2017084506 A 5/2017

\* cited by examiner

*Primary Examiner* — Cynthia H Kelly
*Assistant Examiner* — Monique M Wills
(74) *Attorney, Agent, or Firm* — CKC & PARTNERS CO., LLC

(57) ABSTRACT

Provided is a fluoride ion secondary battery having high charging and discharging efficiency at room temperature. The fluoride ion secondary battery includes a positive electrode material layer including Ag; a negative electrode material layer including at least one of $CeF_3$ and $PbF_2$; and a solid electrolyte layer including $LaF_3$ and disposed between the positive electrode material layer and the negative electrode material layer. The fluoride ion secondary battery may further include a negative electrode current collector layer disposed on an outer side of the negative electrode material layer. The negative electrode current collector layer may include carbon when the negative electrode material layer includes $CeF_3$ or may include a Pb foil when the negative electrode material layer includes $PbF_2$.

8 Claims, 12 Drawing Sheets

FLUORIDE ION SECONDARY BATTERY

This application is based on and claims the benefit of priority from Japanese Patent Application No. 2021-010584, filed on 26 Jan. 2021, the content of which is incorporated herein by reference.

BACKGROUND OF THE INVENTION

Field of the Invention

The present invention relates to a fluoride ion secondary battery.

Related Art

In the conventional art, fluoride ion secondary batteries are proposed using fluoride ions as carriers. Fluoride ion secondary batteries are expected to be superior in performance to lithium-ion secondary batteries, and have been studied in various ways in recent years.

For example, a fluoride ion secondary battery proposed in the conventional art includes a positive electrode; a negative electrode including at least one of metal and a fluoride each including at least La; an ion conducting medium for conducting fluoride ions; and a housing that accommodates the positive electrode, the negative electrode, and the ion conducting medium in a sealed manner and has an interior oxygen concentration of 2 ppm or less (see, for example, Patent Document 1).

Patent Document 1: Japanese Unexamined Patent Application, Publication No. 2017-84506

SUMMARY OF THE INVENTION

Unfortunately, the conventional fluoride ion secondary battery as disclosed in Patent Document 1 can operate only at high temperature, such as 150° C., and will decrease by half in charging and discharging efficiency during three cycles of charge and discharge, which is significant degradation during the cycles. Thus, a need exists to develop a fluoride ion secondary battery having high charging and discharging efficiency at room temperature.

The present invention has been made in light of the circumstances mentioned above, and an object of the present invention is to provide a fluoride ion secondary battery having high charging and discharging efficiency at room temperature.

(1) An aspect of the present invention is to provide a fluoride ion secondary battery including: a positive electrode material layer including Ag; a negative electrode material layer including at least one of $CeF_3$ and $PbF_2$; and a solid electrolyte layer including $LaF_3$ and disposed between the positive electrode material layer and the negative electrode material layer.

(2) In the fluoride ion secondary battery according to aspect (1), the negative electrode material layer may include $CeF_3$, and the fluoride ion secondary battery according to aspect (1) may further include a negative electrode current collector layer including carbon and disposed on an outer side of the negative electrode material layer.

(3) In the fluoride ion secondary battery according to aspect (1), the negative electrode material layer may include $PbF_2$, and the fluoride ion secondary battery according to aspect (1) may further include a negative electrode current collector layer including a Pb foil and disposed on an outer side of the negative electrode material layer.

(4) The fluoride ion secondary battery according to any one of aspects (1) to (3) may further include a positive electrode current collector layer including carbon and disposed on an outer side of the positive electrode material layer.

(5) In the fluoride ion secondary battery according to any one of aspects (1) to (4), the positive electrode material layer may have a thickness of 10 nm or more and less than 120 nm.

(6) In the fluoride ion secondary battery according to any one of aspects (1) to (5), the positive electrode material layer may have a thickness of 10 nm or more and 60 nm or less.

(7) In the fluoride ion secondary battery according to any one of aspects (1) to (6), the positive electrode material layer may have a thickness of 10 nm or more and 30 nm or less.

(8) In the fluoride ion secondary battery according to any one of aspects (1) to (7), the negative electrode material layer may have a thickness of 10 nm or more and less than 200 nm.

(9) In the fluoride ion secondary battery according to any one of aspects (1) to (8), the negative electrode material layer may have a thickness of 10 nm or more and 50 nm or less.

The present invention makes it possible to provide a fluoride ion secondary battery having high charging and discharging efficiency at room temperature.

DETAILED DESCRIPTION OF THE INVENTION

Hereinafter, embodiments of the present invention will be described in detail with reference to the drawings.

Figure 1:
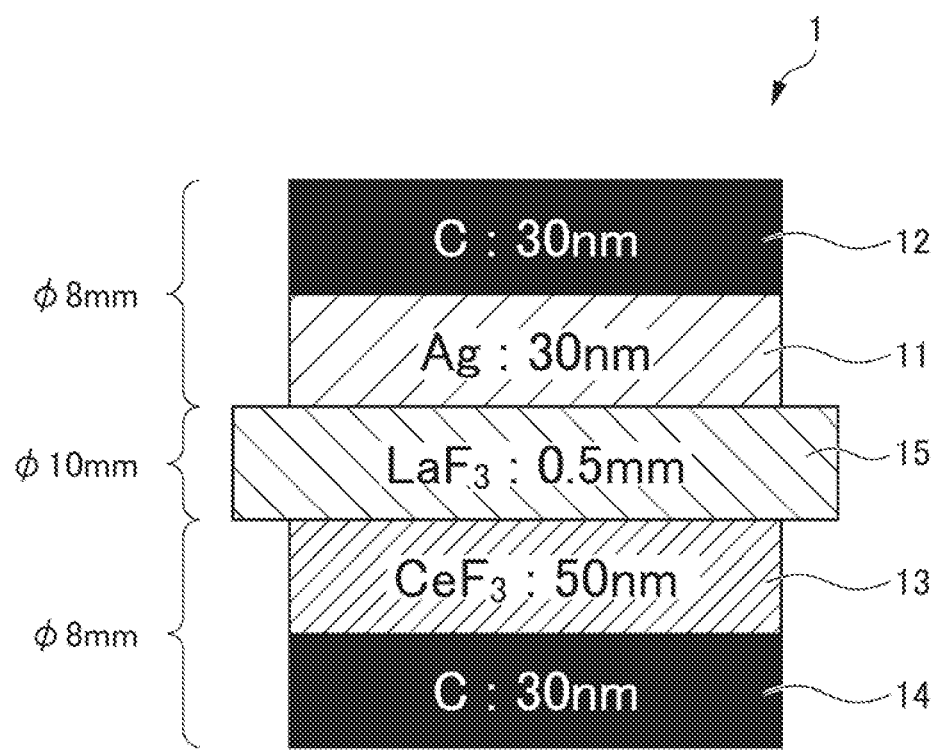
FIG. 1 is a view showing the structure of a fluoride ion secondary battery according to a first embodiment of the present invention.

FIG. 1 is a view showing the structure of a fluoride ion secondary battery 1 according to a first embodiment of the present invention. As shown in FIG. 1, the fluoride ion secondary battery 1 according to the embodiment includes a positive electrode material layer 11, a negative electrode material layer 13, and a solid electrolyte layer 15 disposed between the positive electrode material layer 11 and the negative electrode material layer 13.

The positive electrode material layer 11 includes Ag. Preferably, the positive electrode material layer 11 includes only Ag or consists of Ag. The positive electrode material layer 11 releases fluoride ions F⁻ during discharging and stores fluoride ions F⁻ during charging. The positive electrode material layer 11 including Ag is characterized by being less likely to cause overvoltage at room temperature. The positive electrode material layer 11 including Ag may be formed by, for example, sputtering as described later.

The positive electrode material layer 11 preferably has a thickness of 10 nm or more and less than 120 nm. The positive electrode material layer 11 with a thickness of less than 10 nm may fail to be formed due to particle- or island-like deposition, or may cause undesirable uneven reaction even if successfully formed. The positive electrode material layer 11 with a thickness of more than 120 nm may cause an increase in overvoltage and a decrease in charging and discharging efficiency, which is not desirable. The positive electrode material layer 11 more preferably has a thickness of 10 nm or more and 60 nm or less, even more preferably 10 nm or more and 30 nm or less. FIG. 1 shows an example in which the positive electrode material layer 11 has a thickness of 30 nm.

The negative electrode material layer 13 includes at least one of $CeF_3$ and $PbF_2$. The negative electrode material layer 13 preferably includes $CeF_3$. The negative electrode material layer 13 stores fluoride ions F⁻ during discharging and releases fluoride ions F⁻ during charging. The negative electrode material layer 13 including at least one of $CeF_3$ and $PbF_2$ is characterized by being less likely to cause overvoltage at room temperature. The negative electrode material layer 13 including at least one of $CeF_3$ and $PbF_2$ may be formed by, for example, sputtering as described later.

The negative electrode material layer 13 preferably has a thickness of 10 nm or more and less than 200 nm. The negative electrode material layer 13 with a thickness of less than 10 nm may fail to be formed due to particle- or island-like deposition, or may cause undesirable uneven reaction even if successfully formed. The negative electrode material layer 13 with a thickness of more than 200 nm may cause an increase in overvoltage and a decrease in charging and discharging efficiency, which is not desirable. The negative electrode material layer 13 more preferably has a thickness of 10 nm or more and 100 nm or less, even more preferably 10 nm or more and 50 nm or less. FIG. 1 shows an example in which the negative electrode material layer 13 has a thickness of 50 nm.

The negative electrode material layer 13 may further include a solid electrolyte including, for example, a fluoride ion-conducting fluoride, and a conductive aid. The negative electrode material layer 13 may further include additional components, such as a binder, as long as such components do not impair the advantageous effects of the embodiment.

The fluoride ion-conducting fluoride may be any fluoride having fluoride ion conductivity. Examples include $CeBaF_x$, $BaLaF_y$, and other fluoride ion-conducting fluorides. The negative electrode material layer containing such a fluoride ion-conducting fluoride has improved fluoride ion conductivity.

The conductive aid may be any type having electron conductivity, such as carbon black. Examples of the carbon black include furnace black, Ketjen black, and acetylene black. The negative electrode material layer containing such a conductive aid has improved electron conductivity.

The solid electrolyte layer 15 includes $LaF_3$. The solid electrolyte layer 15 including $LaF_3$ has excellent fluoride ion F⁻ conductivity. The solid electrolyte layer 15 including $LaF_3$ may be a commercially available $LaF_3$ substrate. The thickness of the solid electrolyte layer 15 is typically, but not limited to, 0.1 mm to 0.5 mm. FIG. 1 shows an example in which the solid electrolyte layer 15 has a thickness of 0.5 mm.

The fluoride ion secondary battery 1 according to the embodiment preferably further includes a positive electrode current collector layer 12 disposed on the outer side of the positive electrode material layer 11. The positive electrode current collector layer 12 may be any type having electron conductivity. For example, the positive electrode current collector layer 12 preferably includes carbon. The positive electrode current collector layer 12 may have any thickness, while FIG. 1 shows an example in which the positive electrode current collector layer 12 has a thickness of 30 nm.

The fluoride ion secondary battery 1 according to the embodiment preferably further includes a negative electrode current collector layer 14 disposed on the outer side of the negative electrode material layer 13. The negative electrode current collector layer 14 may be any type having electron conductivity. For example, when the negative electrode material layer 13 includes $CeF_3$, the negative electrode current collector 14 preferably includes carbon. When the negative electrode material layer includes $PbF_2$, the negative electrode current collector layer preferably includes a Pb foil. The negative electrode current collector layer 14 may have any thickness, while FIG. 1 shows an example in which the negative electrode current collector layer 14 has a thickness of 30 nm.

The fluoride ion secondary battery 1 according to the embodiment having the features described above preferably further includes a case, such as a coin cell case or a laminate cell case.

The fluoride ion secondary battery 1 according to the embodiment may have any shape or size. FIG. 1 shows a cylindrical example. In the example shown in FIG. 1, the positive electrode material layer 11, the positive electrode current collector layer 12, the negative electrode material layer 13, and the negative electrode current collector layer 14 each have a diameter φ of 8 mm, and the solid electrolyte layer 15 has a diameter φ of 10 mm. The solid electrolyte layer 15 with such a larger diameter prevents short circuit between the positive and negative electrodes.

Next, a method for producing the fluoride ion secondary battery according to the embodiment will be described in detail with reference to FIG. 2.

Figure 2:
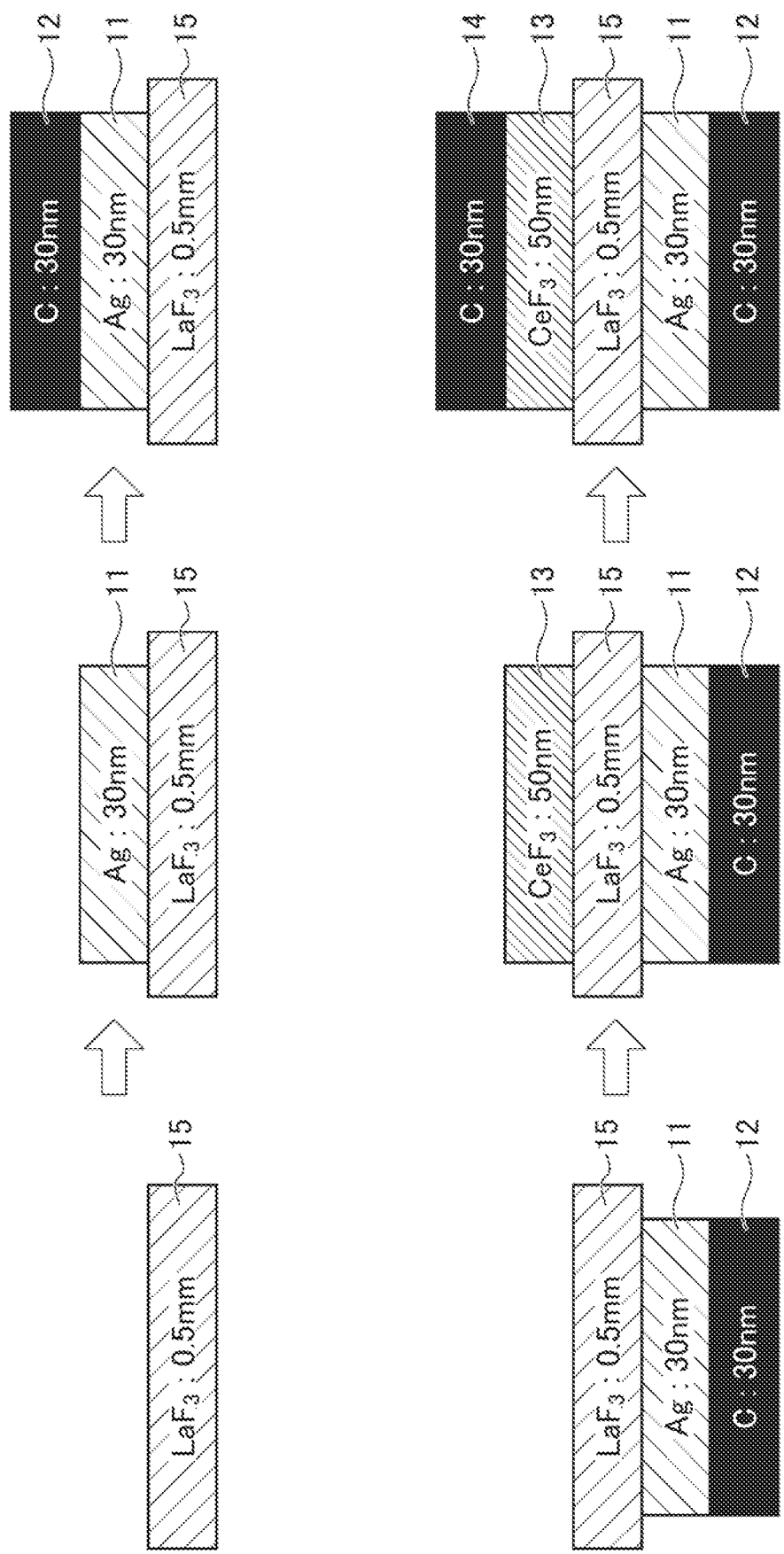
FIG. 2 is a view showing an exemplary method for producing the fluoride ion secondary battery according to the first embodiment.

FIG. 2 is a view showing an exemplary method for producing a fluoride ion secondary battery according to the embodiment. As shown in FIG. 2, first, a $LaF_3$ substrate as a solid electrolyte layer 15 is placed in a predetermined jig (not shown) not exposed to the air (for example, in an environment with a dew point of 80° C. or less and an oxygen concentration of 1 ppm or less). This step may be performed, for example, in a glove box manufactured by UNICO Ltd., in which the environment mentioned above is provided.

The $LaF_3$ substrate may be a commercially available $LaF_3$ substrate, such as one manufactured by Pier Optics Co., Ltd. The size of the $LaF_3$ substrate is, for example, but not limited to, 10 mm in diameter φ and 0.5 mm in thickness. The $LaF_3$ substrate to be used preferably has a mirror-finished surface.

Subsequently, the $LaF_3$ substrate set in the jig is transferred into the chamber of a sputtering system while the environment mentioned above is maintained. The sputtering system may be a commercially available sputtering system, such as, Sputtering Equipment EB1000 manufactured by Canon Anelva Corporation. The degree of vacuum in the chamber is, for example, $5 \times 10^{-4}$ Pa or less before the deposition.

Subsequently, DC sputtering is performed using the sputtering system to deposit a positive electrode material layer 11 including Ag on one surface of the $LaF_3$ substrate as the solid electrolyte layer 15. After the deposition, intermission for a certain period of time is provided.

Subsequently, DC sputtering is performed using the sputtering system to deposit a positive electrode current collector layer 12 including carbon on the deposited positive electrode material layer 11.

Subsequently, the $LaF_3$ substrate as the solid electrolyte layer 15 with the positive electrode material layer 11 and the positive electrode current collector layer 12 deposited in order on one surface thereof is transferred from the chamber of the sputtering system into the glove box while the environment mentioned above is maintained. After the transfer, the $LaF_3$ substrate is taken out of the jig, turned upside down, and placed again in the jig with the other surface of the substrate facing upward.

Subsequently, the $LaF_3$ substrate turned upside down and set again in the jig is transferred into the chamber of the sputtering system while the environment mentioned above is maintained. After the transfer, RF sputtering is performed using the sputtering system to deposit a negative electrode material layer 13 including $CeF_3$ on the other surface of the $LaF_3$ substrate as the solid electrolyte layer 15. A similar operation may be used to deposit a negative electrode material layer including $PbF_2$.

Subsequently, DC spurring is performed using the sputtering system to deposit a negative electrode current collector layer 14 including carbon on the deposited negative electrode material layer 13. A similar operation may be used to deposit a negative electrode current collector layer including a Pb foil.

Subsequently, the $LaF_3$ substrate as the solid electrolyte layer 15 with the negative electrode material layer 13 and the negative electrode current collector layer 14 deposited in order on the other surface thereof is transferred from the chamber of the sputtering system into the glove box while the environment mentioned above is maintained. After the transfer, the product is subjected to an assembling step including installing it in a case, such as a coin cell case or a laminate cell case, to form the fluoride ion secondary battery 1 according to the embodiment.

For the deposition of each layer, each deposition rate may be evaluated in advance, and the sputtering time may be adjusted based on the evaluated deposition rates, so that the thickness of each layer may be controlled. Specifically, each sputtering deposition may be performed under certain conditions to form a layer on, for example, a quartz plate partially masked with a masking tape, such as a Kapton tape, attached thereto. Subsequently, the masking tape may be removed, and then the difference in level between the unmasked portion and the portion from which the masking tape has been removed (corresponding to the thickness of the film) is measured with a profile meter. The measurement may be performed under different conditions for each sputtering deposition, and the results of the measurement may be used to make a calibration curve, from which the deposition rate may be determined. This process makes it possible to control each deposition thickness as desired.

Next, the cell capacity of the fluoride ion secondary battery 1 according to the embodiment will be described. A positive electrode half cell and a negative electrode half cell may each have a capacity as shown below with respect to an example of the fluoride ion secondary battery 1 according to the embodiment shown in FIG. 1.

Positive Electrode Half Cell
Theoretical capacity: 248 mAh/g
Density: 10.49 g/cm$^3$
Thickness: 30 nm
Electrode area: 0.5 cm$^2$
Battery capacity: 3.92 µAh Negative Electrode Half Cell
Theoretical capacity: 408 mAh/g
Density: 6.77 g/cm$^3$
Thickness: 50 nm
Electrode area: 0.5 cm$^2$
Battery capacity: 6.9 µAh Regarding the example of the fluoride ion secondary battery 1 according to the embodiment, the cell capacity is determined by the theoretical capacity of the positive electrode, which is lower than that of the negative electrode as shown above. Specifically, the cell capacity of the example of the fluoride ion secondary battery according to the embodiment shown in FIG. 1 is determined to be 3.92 µAh (the capacity of the positive electrode), and the N/P ratio is calculated to be 3.92/6.9=1.76.

The fluoride ion secondary battery 1 according to the embodiment having the features described above has advantageous effects as shown below. The fluoride ion secondary battery 1 according to the embodiment includes a positive electrode material layer 11 including Ag; a negative electrode material layer 13 including at least one of $CeF_3$ and $PbF_2$; and a solid electrolyte layer 15 including $LaF_3$ and disposed between the positive electrode material layer 11 and the negative electrode material layer 13. The fluoride ion secondary battery 1 according to the embodiment is constructed using materials that are selected so as to be less likely to cause overvoltage even during room temperature operation of the corresponding half cell in a charging and discharging test and an intermittent charging and discharging test. Even when operated at room temperature, therefore, the fluoride ion secondary battery according to the embodiment can be prevented from suffering from high overvoltage and prevented from degrading during charging and discharging cycles, and can exhibit high charging and discharging efficiency.

The embodiments described above are not intended to limit the present invention and may be altered or modified within the scope of the present invention where the objects of the present invention can be achieved.

EXAMPLES

Next, examples of the present invention will be described, which are not intended to limit the scope of the present invention.

Example 1

In Example 1, a fluoride ion secondary battery according to the first embodiment shown in FIG. 1 was prepared according to the production method described above. The prepared fluoride ion secondary battery of Example 1 was subjected to a constant-current (CC) charging and discharging test under the conditions shown below.

The CC charging and discharging test was performed under vacuum ($1 \times 10^{-4}$ Pa or less) at room temperature 25° C. The cell capacity of the fluoride ion secondary battery of Example 1 is determined by the theoretical capacity (248 mAh/g) of the positive electrode, which includes Ag with a theoretical capacity lower than that of $CeF_3$ in the negative electrode. Thus, the current load was 200 nA, which corresponds to 1/20 C of the theoretical capacity (248 mAh/g) of the positive electrode including Ag. The current load corresponds to about 0.4 µA/cm² per unit area since the area of the cell of Example 1 is about 0.5 cm². The cut-off condition was a cut-off voltage of 1.0 to 4.2 V or a cut-off time of 20 hours. Intermission for 10 minutes was provided at switching between charging and discharging.

The charging and discharging test procedure was as follows. A rate test was performed during the first 10 cycles. Specifically, the rate was gradually increased such that the rate was 1/20 C during 1st to 3rd cycles, 1/10 C during 4th to 6th cycles, 1 C during 7th and 8th cycles, and 5 C during 9th and 10th cycles. After the rate test, a 100-cycle charging and discharging test was performed at a constant rate of 1 C. In the middle of the test, the rate was changed to 1/20 C for the check of the charging and discharging capacity. The results of the charging and discharging test are shown in FIGS. 3 to 5.

Figure 3:
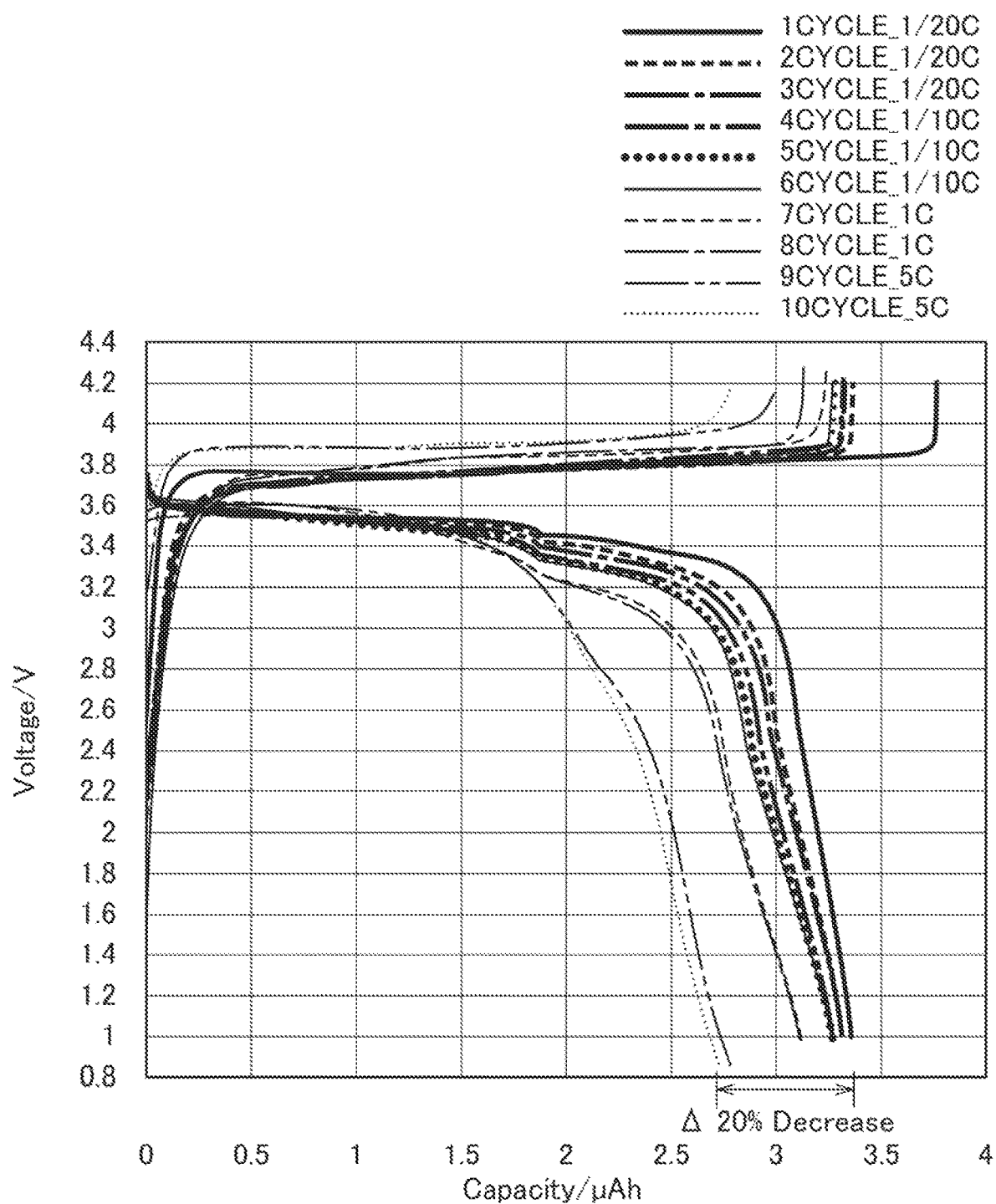
FIG. 3 is a graph showing the charging and discharging curves of a fluoride ion secondary battery according to Example 1.

FIG. 3 is a graph showing the charging and discharging curves of the fluoride ion secondary battery of Example 1. FIG. 4 is a graph showing the relationship between the capacity and the square root of the number of cycles with respect to the fluoride ion secondary battery of Example 1. FIG. 5 is a graph showing the relationship between the charging and discharging efficiency and the square root of the number of cycles with respect to the fluoride ion secondary battery of Example 1. FIG. 3 shows the charging and discharging curves obtained during the first 10-cycle rate test. FIGS. 4 and 5 show the charging and discharging capacity and the charging and discharging efficiency obtained in the rate test and in the 100-cycle charging and discharging test after the rate test.

Figure 4:
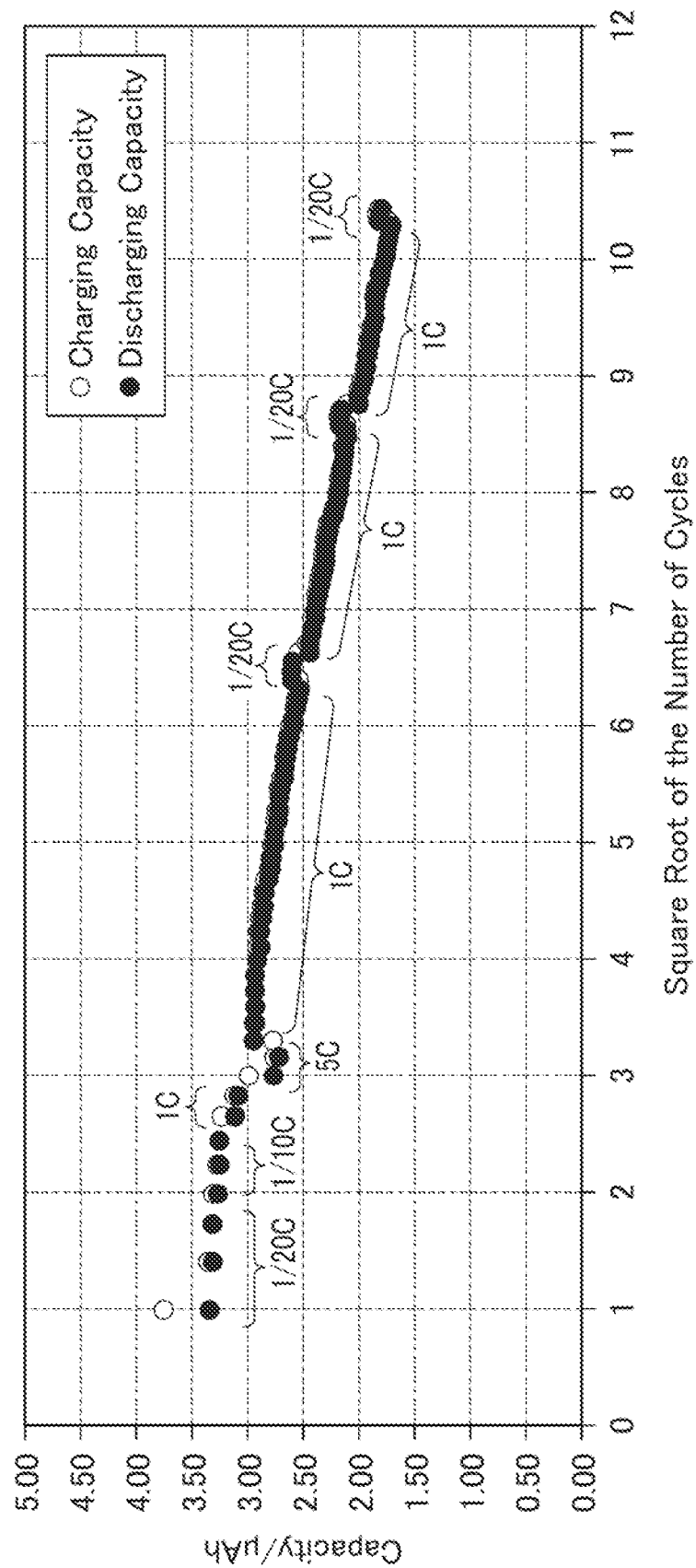
FIG. 4 is a graph showing the relationship between the capacity and the square root of the number of cycles with respect to the fluoride ion secondary battery according to Example 1.
Figure 5:
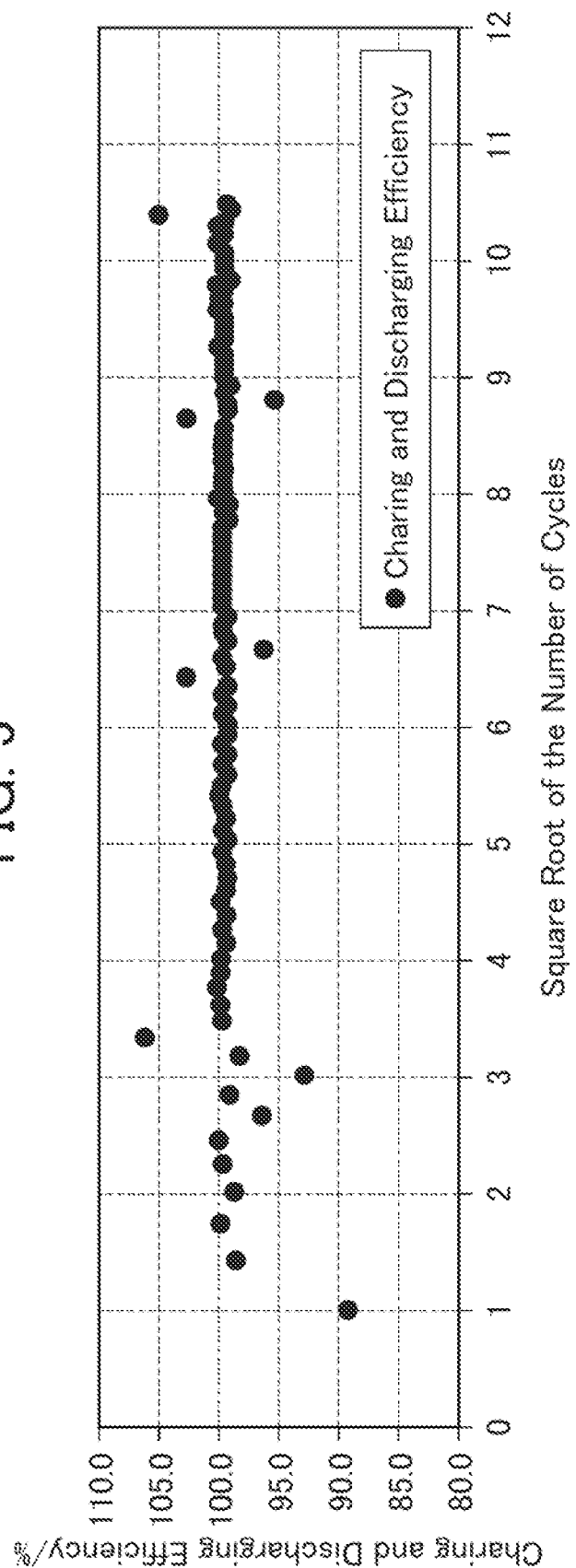
FIG. 5 is a graph showing the relationship between the charging and discharging efficiency and the square root of the number of cycles with respect to the fluoride ion secondary battery according to Example 1.

FIGS. 3 to 5 indicate that the fluoride ion secondary battery of Example 1 can operate at room temperature. At room temperature, the initial charging and discharging efficiency is 90%, and 80% of the discharging capacity at 0.05 C remains at 5 C, which show good rate characteristics. At room temperature, the charging and discharging efficiency during the charging and discharging cycles at 1 C was found to be 99%, and the capacity retention after the 100 cycles of charging and discharging was found to be 50%. Those results show that the fluoride ion secondary battery of Example 1 has high charging and discharging efficiency at room temperature.

Example 2

Figure 6:
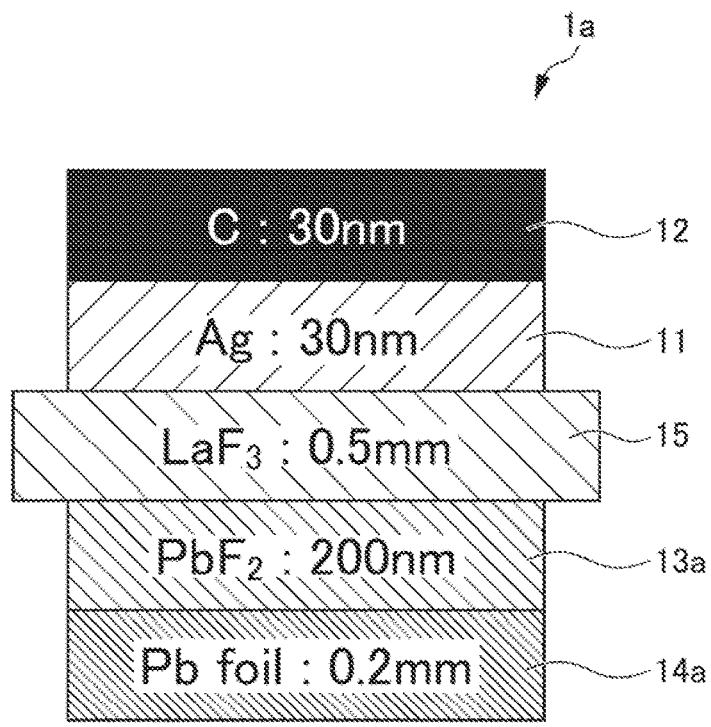
FIG. 6 is a view showing the structure of a fluoride ion secondary battery according to Example 2.

FIG. 6 is a view showing the structure of a fluoride ion secondary battery 1a according to Example 2. In Example 2, the fluoride ion secondary battery 1a shown in FIG. 6 was prepared according to the production method described above. The fluoride ion secondary battery 1a of Example 2 may also be called a Ag positive electrode half cell, in which a negative electrode material layer 13a including $PbF_2$ and having a thickness of 200 nm is provided in place of the negative electrode material layer 13 including $CeF_3$ and having a thickness of 50 nm in the fluoride ion secondary battery of Example 1 and in which a negative electrode current collector layer 14a including a 0.2 mm-thick Pb foil is provided in place of the negative electrode current collector 14 including carbon and having a thickness of 30 nm. The prepared fluoride ion secondary battery of Example 2 was subjected to an intermittent charging and discharging test under the conditions shown below.

Figure 8:
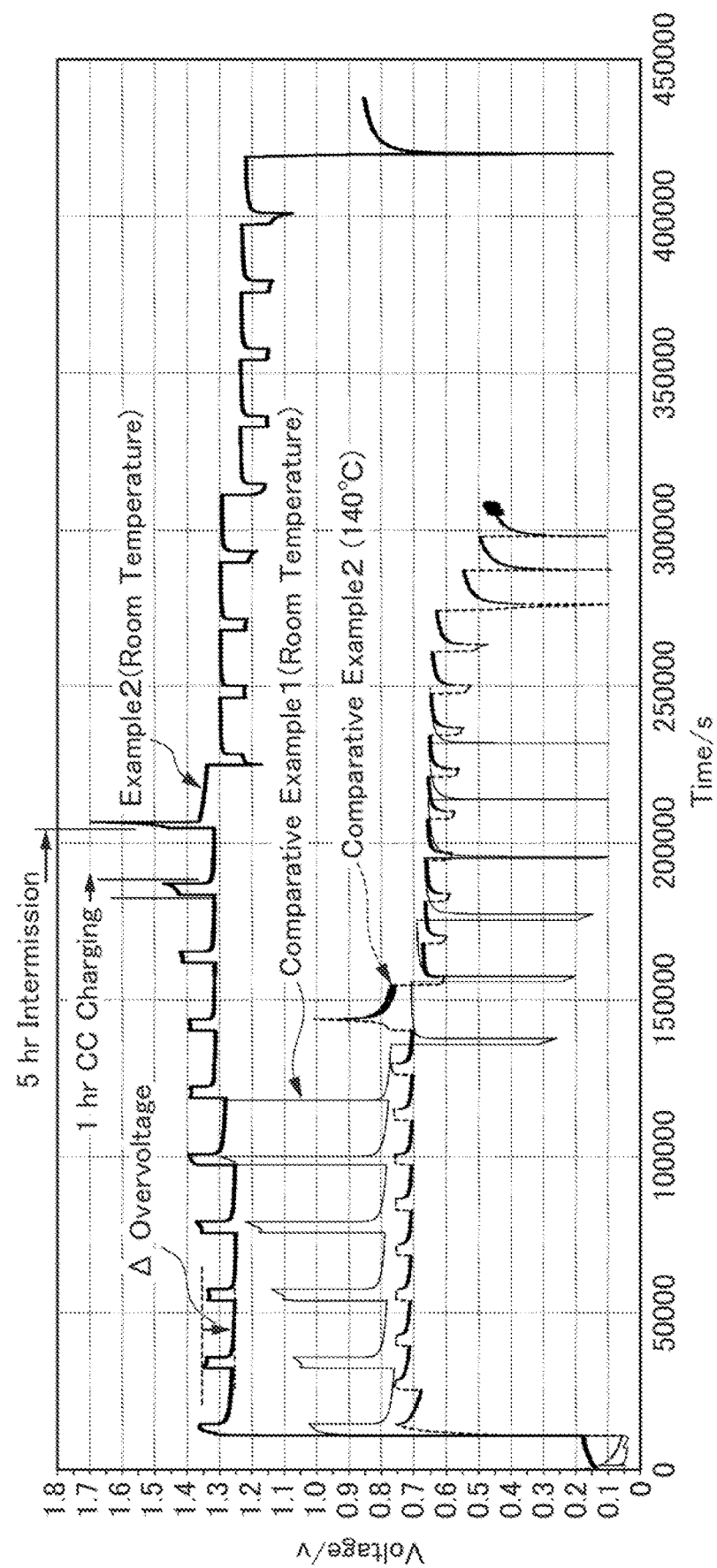
FIG. 8 is a graph showing the intermittent charging and discharging curves of the fluoride ion secondary batteries according to Example 2 and Comparative Examples 1 and 2.

The intermittent charging and discharging test was performed under vacuum ($1 \times 10^{-5}$ Pa) at room temperature 25° C. Specifically, the intermittent charging and discharging test included repeating CC charging for 1 hour and intermission for 5 hours and repeating CC discharging for 1 hour and intermission for 5 hours. The current load was 400 nA, which corresponds to 1/10 C with respect to the designed capacity of the positive electrode, and the voltage was in the range of 0 to 1.7 V. FIG. 8 shows the results of the intermittent charging and discharging test.

Comparative Examples 1 to 6

Figure 7:
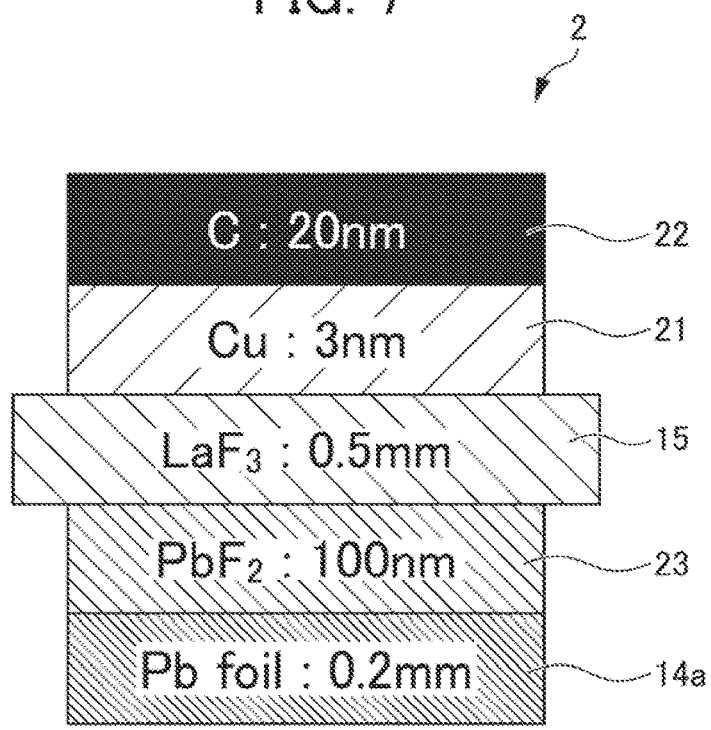
FIG. 7 is a view showing the structure of a fluoride ion secondary battery according to Comparative Examples 1 and 2.

FIG. 7 is a view showing the structure of a fluoride ion secondary battery 2 according to Comparative Examples 1 to 6. In Comparative Examples 1 to 6, the fluoride ion secondary battery 2 shown in FIG. 7 was prepared according to the production method described above. The fluoride ion secondary battery 2 according to Comparative Examples 1 to 6 may also be called a Cu positive electrode half cell, in which a positive material layer 21 including Cu and having a thickness of 3 nm is provided in place of the positive electrode material layer 11 including Ag and having a thickness of 30 nm in the fluoride ion secondary battery 1a of Example 2 and in which a positive electrode current collector layer 22 is provided with a thickness different from that of the positive electrode current collector layer 12 and a negative electrode material layer 23 including $PbF_2$ is provided with a thickness different from that of the negative electrode material layer 13a including $PbF_2$. The fluoride ion secondary battery shown in FIG. 7 was subjected to an intermittent charging and discharging test under the conditions shown below. The fluoride ion secondary battery shown in FIG. 7 was also subjected to a CC charging and discharging test under the same conditions as those in Example 1. More specifically, the CC charging and discharging test was performed at room temperature 25° C. in Comparative Example 1, at 140° C. in Comparative Example 2, at 60° C. in Comparative Example 3, at 80° C. in Comparative Example 4, at 100° C. in Comparative Example 5, and at 120° C. in Comparative Example 6.

The intermittent charging and discharging test was performed under vacuum ($1 \times 10^{-5}$ Pa) at room temperature 25° C. in Comparative Example 1 and under vacuum ($1 \times 10^{-5}$ Pa) at 140° C. in Comparative Example 2. In each of Comparative Examples 1 and 2, the intermittent charging and discharging test included repeating CC charging for 1 hour and intermission for 3 hours and repeating CC discharging for 0.5 hours and intermission for 3 hours. The current load was 123 nA, which corresponds to 1/10 C with respect to the designed capacity of the positive electrode, and the voltage was in the range of 0.1 to 1.3 V. FIG. 8 shows the results of the intermittent charging and discharging test.

FIG. 8 is a graph showing the intermittent charging and discharging curves of the fluoride ion secondary batteries 1a and 2 according to Example 2 and Comparative Examples 1 and 2. In FIG. 8, the height of peaks observed intermittently at the start of charging, namely the difference between OCV and CCV, represents the magnitude of overvoltage. In all of Example 2 and Comparative Examples 1 and 2, the peak switched to minus in the middle of the test, which means switching to discharging occurred after the set charging voltage was reached. The results in FIG. 8 show that the set charging voltage was reached earlier in Comparative Examples 1 and 2 than in Example 2.

FIG. 8 also indicates that when subjected to the intermittent charging and discharging test at room temperature, the Cu positive electrode half cell of Comparative Example 1 shows very high overvoltage and further increases in overvoltage as charging proceeds as compared to the Ag positive electrode half cell of Example 2. This was presumed to be due to the ionic conductivity of $CuF_2$ produced in the Cu positive electrode material layer.

On the other hand, the Cu positive electrode half cell of Comparative Example 2 being subjected to the intermittent charging and discharging test at 140° C. shows a similar level of overvoltage to that of the Ag positive electrode half cell of Example 2 being subjected to the intermittent charging and discharging test at room temperature, which suggests that charging and discharging should be possible at a capacity close to the theoretical capacity of the Cu positive electrode material layer. The results show that reductions in DC component resistance (e.g., electron, ionic conductivity, charge transfer), which is a cause of overvoltage, are important for the operation at room temperature.

Figure 9:
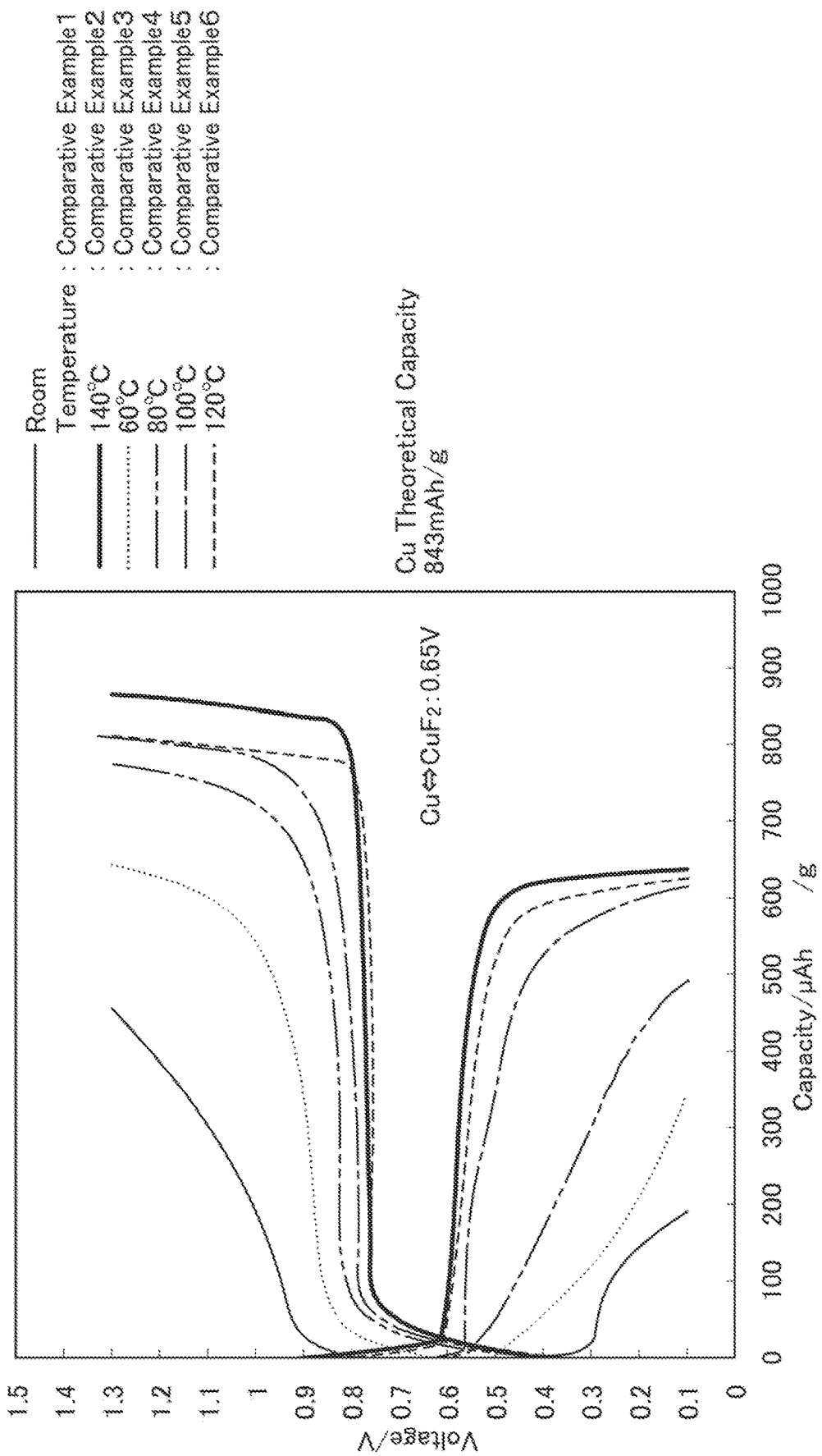
FIG. 9 is a graph showing the charging and discharging curves of a fluoride ion secondary battery according to Comparative Examples 1 to 6.

FIG. 9 is a graph showing the charging and discharging curves of the fluoride ion secondary battery 2 according to Comparative Examples 1 to 6. FIG. 9 shows the charging and discharging curves obtained in a CC charging and discharging test which was performed at room temperature 25° C. in Comparative Example 1, at 140° C. in Comparative Example 2, at 60° C. in Comparative Example 3, at 80° C. in Comparative Example 4, at 100° C. in Comparative Example 5, and at 120° C. in Comparative Example 6. The charging and discharging curves show that the charging and discharging capacity decreases with decreasing temperature. The results also indicate that charging and discharging at room temperature is difficult when the Cu positive electrode material layer is used.

Example 3

Figure 10:
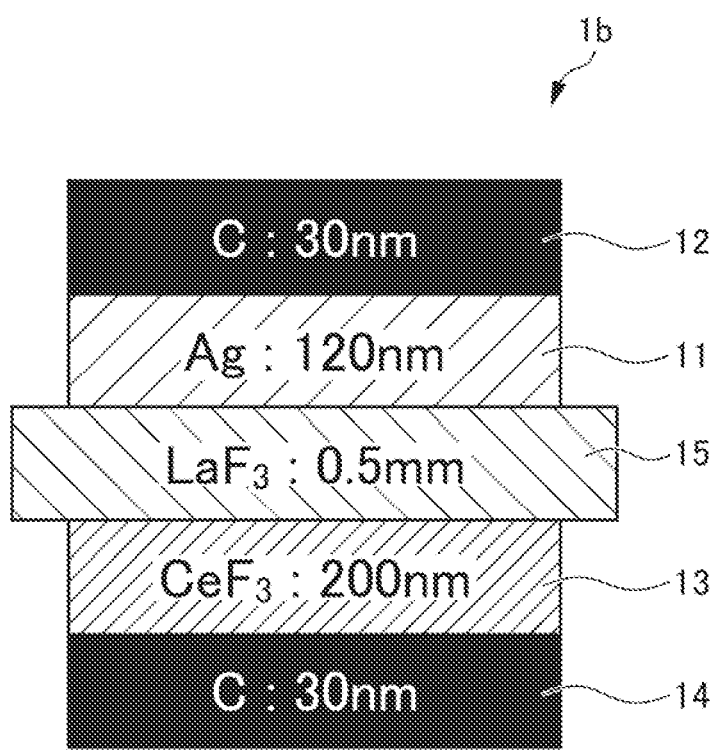
FIG. 10 is a view showing the structure of a fluoride ion secondary battery according to Example 3.

FIG. 10 is a view showing the structure of a fluoride ion secondary battery 1b according to Example 3. In Example 3, the fluoride ion secondary battery 1b shown in FIG. 10 was prepared according to the production method described above. The fluoride ion secondary battery 1b according to Example 3 has a positive electrode material layer 11 including Ag and having a thickness of 120 nm, in place of the positive electrode layer 11 including Ag and having a thickness of 30 nm in the fluoride ion secondary battery of Example 1, and has a negative electrode material layer 13 including $CeF_3$ and having a thickness of 200 nm, in place of the negative electrode material layer 13 including $CeF_3$ and having a thickness of 50 nm in the fluoride ion secondary battery of Example 1.

The prepared fluoride ion secondary battery 1b according to Example 3 was subjected to a CC charging and discharging test under the same conditions as those in Example 1. Specifically, first, a rate test was performed in which the rate was gradually increased, and then a 100-cycle charging and discharging test was performed at a constant rate of 1 C. In the rate test of Example 3, the rate was 1/20 C during 1st to 3rd cycles, 1/10 C during 4th and 5th cycles, 1 C during 6th and 7th cycles, and 2 C during 8th and 9th cycles. The results of the charging and discharging test are shown in FIGS. 11 to 14.

Figure 11:
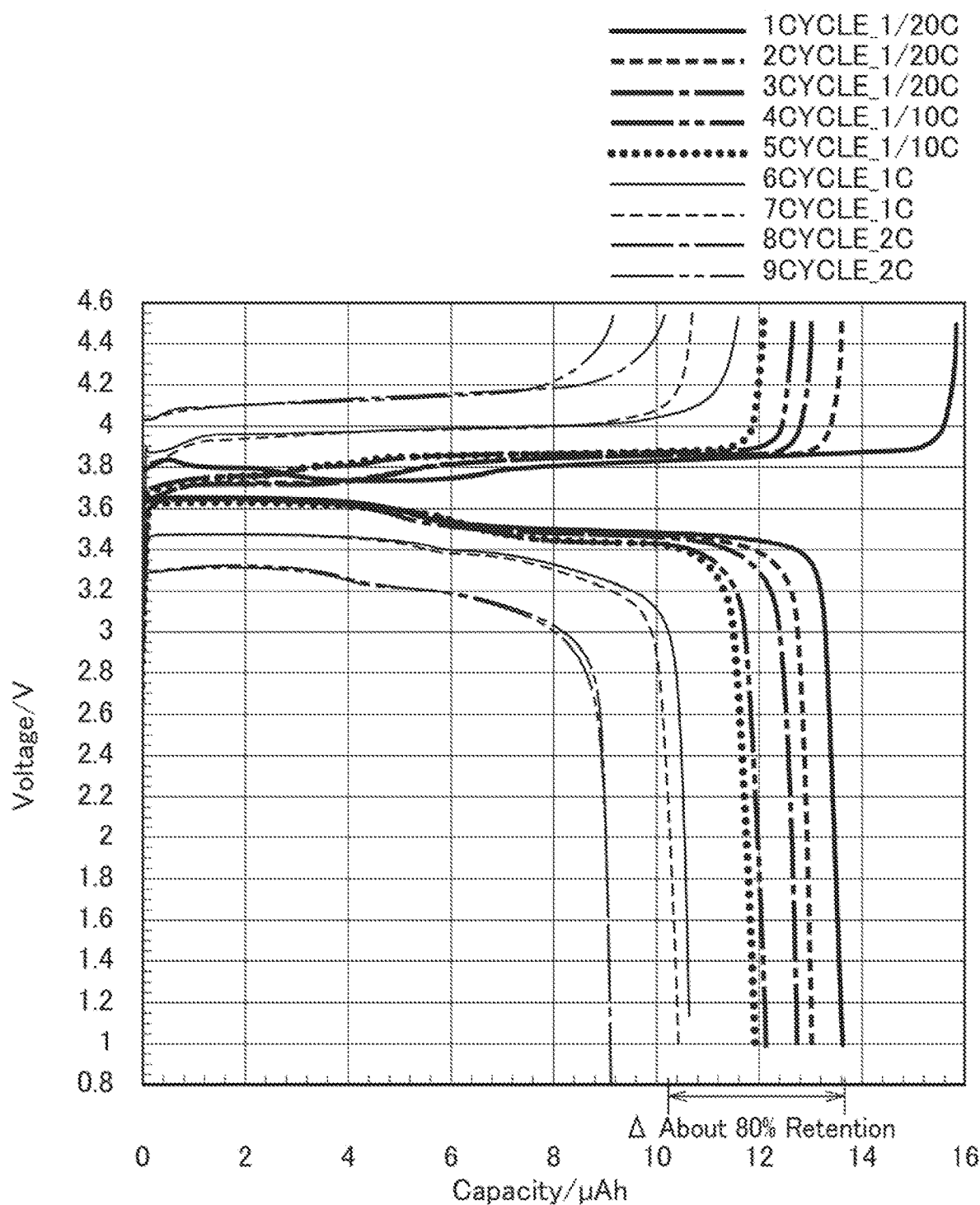
FIG. 11 is a graph showing the charging and discharging curves of the fluoride ion secondary battery according to Example 3.
Figure 12:
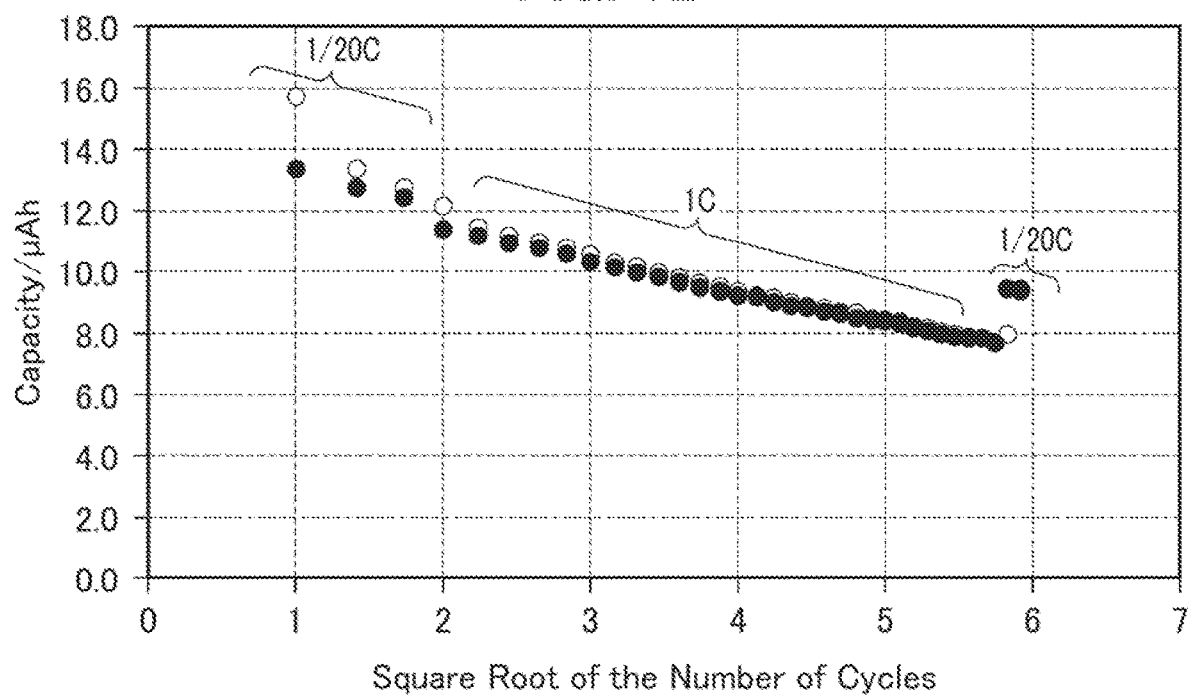
FIG. 12 is a graph showing the relationship between the capacity and the square root of the number of cycles with respect to the fluoride ion secondary battery according to Example 3.
Figure 13:
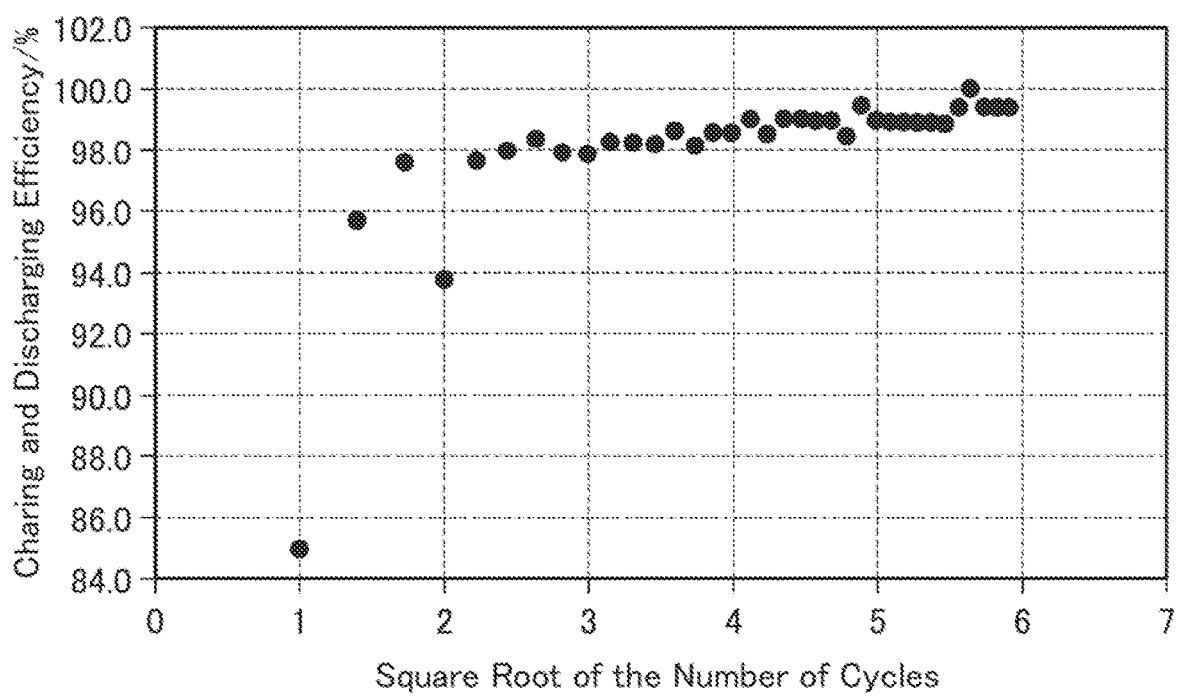
FIG. 13 is a graph showing the relationship between the charging and discharging efficiency and the square root of the number of cycles with respect to the fluoride ion secondary battery according to Example 3.
Figure 14:
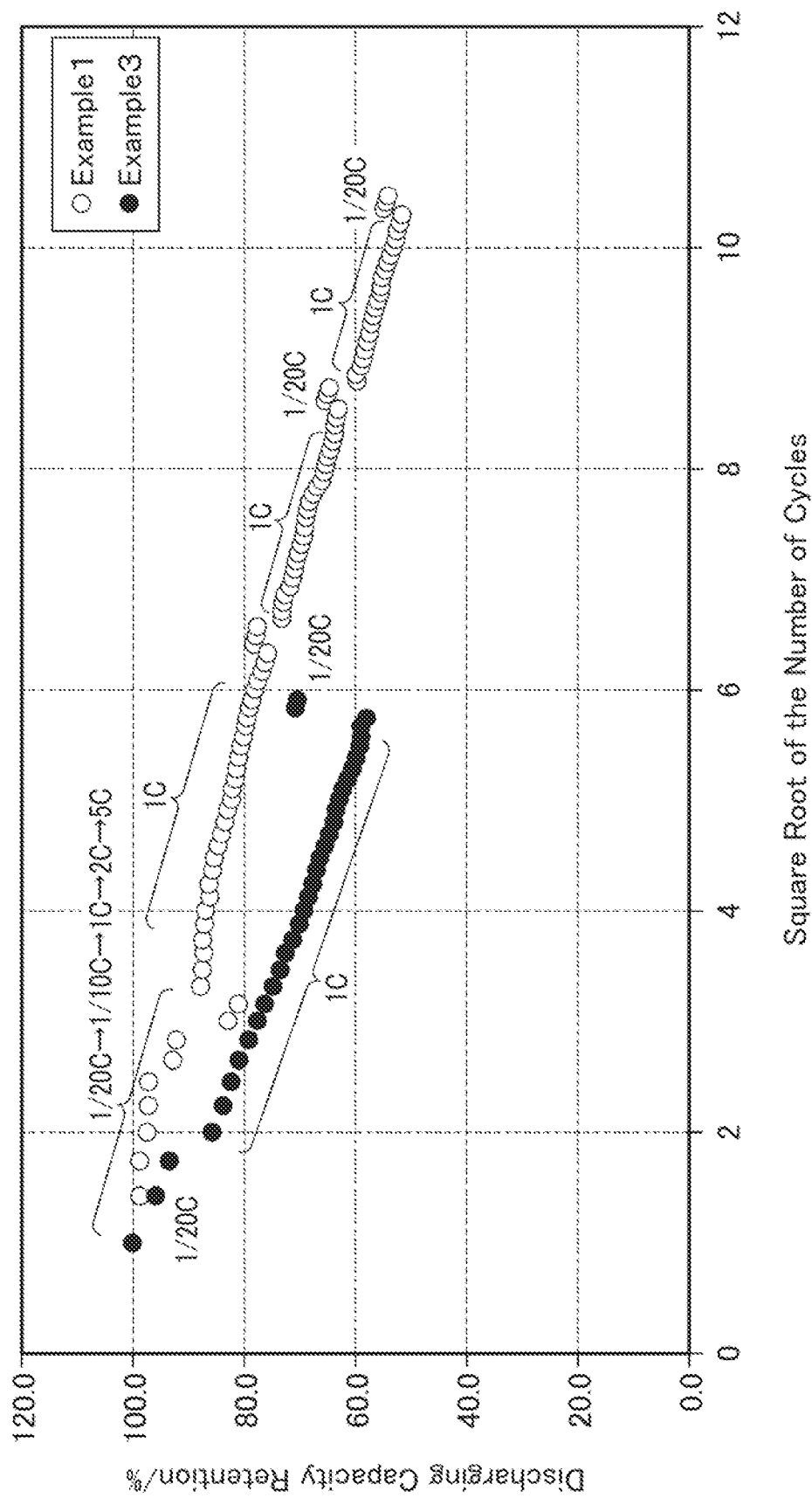
FIG. 14 is a graph showing the relationship between the discharging capacity retention and the square root of the number of cycles with respect to the fluoride ion secondary batteries according to Examples 1 and 3.

FIG. 11 is a graph showing the charging and discharging curves of the fluoride ion secondary battery 1b according to Example 3. FIG. 12 is a graph showing the relationship between the capacity and the square root of the number of cycles with respect to the fluoride ion secondary battery 1b according to Example 3. FIG. 13 is a graph showing the relationship between the charging and discharging efficiency and the square root of the number of cycles with respect to the fluoride ion secondary battery 1b according to Example 3. FIG. 14 is a graph showing the relationship between the discharging capacity retention and the square root of the number of cycles with respect to the fluoride ion secondary batteries 1 and 1b according to Examples 1 and 3.

A comparison between the charging and discharging curves of the fluoride ion secondary batteries 1 and 1b according to Examples 1 and 3 shown in FIG. 11 shows that, in Example 3, the charging and discharging capacity more decreased as the rate was increased to 1 C and 2 C, which shows an increase in overvoltage. The results suggest that the thickness of the positive electrode material layer including Ag should preferably have an upper limit of less than 120 nm and that the thickness of the negative electrode material layer including $CeF_3$ should preferably have an upper limit of less than 200 nm.

The relationship shown in FIGS. 12 and 13 between the capacity, the charging and discharging efficiency, and the square root of the number of cycles with respect to the fluoride ion secondary battery 1b according to Example 3 was compared with the relationship shown in FIGS. 4 and 5 between the capacity, the charging and discharging efficiency, and the square root of the number of cycles with respect to the fluoride ion secondary battery 1 according to Example 1. The comparison indicates that, in the initial rate test, the charging and discharging capacity and the charging and discharging efficiency decrease more in Example 3. In Example 3, the charging and discharging efficiency during the 100 cycles of charging and discharging at a rate of 1 C is around 98%, which has been found to be slightly lower than that in Example 1. The cycle durability has also been found to deteriorate more in Example 3. This was presumed to be due to, for example, volume change-induced delamination of each layer. Those results also suggest that the thickness of the positive electrode material layer including Ag should preferably have an upper limit of less than 120 nm and that the thickness of the negative electrode material layer including $CeF_3$ should preferably have an upper limit of less than 200 nm.

The relationships shown in FIG. 14 between the discharging capacity retention and the square root of the number of cycles with respect to the fluoride ion secondary batteries 1 and 1b according to Examples 1 and 3 indicate that, in the cycle durability test at 1 C, the battery 1 of Example 3 deteriorates more than the battery 1b of Example 1. It has been found, however, that, in Example 3, the discharging capacity retention recovers during the check of the capacity at a rate of $\frac{1}{20}$ C in the middle of the test. Those results also suggest that the thickness of the positive electrode material layer including Ag should preferably have an upper limit of less than 120 nm and that the thickness of the negative electrode material layer including $CeF_3$ should preferably have an upper limit of less than 200 nm.

EXPLANATION OF REFERENCE NUMERALS

1, 1a, 1b: Fluoride ion secondary battery
11: Positive electrode material layer
12: Positive electrode current collector layer
13, 13a: Negative electrode material layer
14, 14a: Negative electrode current collector layer
15: Solid electrolyte layer

What is claimed is:

1. A fluoride ion secondary battery comprising:
a positive electrode material layer comprising Ag;
a negative electrode material layer comprising at least one of $CeF_3$ and $PbF_2$; and
a solid electrolyte layer comprising an $LaF_3$ substrate and disposed between the positive electrode material layer and the negative electrode material layer,
wherein the positive electrode material layer has a thickness of 10 nm or more and less than 120 nm,
the negative electrode material layer has a thickness of 10 nm or more and less than 200 nm,
the $LaF_3$ substrate has a thickness of 0.1 mm to 0.5 mm, and
the positive electrode material layer has a theoretical capacity that is lower than a theoretical capacity of the negative electrode material layer.

2. The fluoride ion secondary battery according to claim 1, wherein
the negative electrode material layer comprises $CeF_3$,
the fluoride ion secondary battery further comprising a negative electrode current collector layer comprising carbon and disposed on an outer side of the negative electrode material layer.

3. The fluoride ion secondary battery according to claim 1, wherein
the negative electrode material layer comprises $PbE_2$,
the fluoride ion secondary battery further comprising a negative electrode current collector layer comprising a Pb foil and disposed on an outer side of the negative electrode material layer.

4. The fluoride ion secondary battery according to claim 1, further comprising a positive electrode current collector layer comprising carbon and disposed on an outer side of the positive electrode material layer.

5. The fluoride ion secondary battery according to claim 1, wherein the positive electrode material layer has a thickness of 10 nm or more and 60 nm or less.

6. The fluoride ion secondary battery according to claim 1, wherein the positive electrode material layer has a thickness of 10 nm or more and 30 nm or less.

7. The fluoride ion secondary battery according to claim 1, wherein the negative electrode material layer has a thickness of 10 nm or more and 100 nm or less.

8. The fluoride ion secondary battery according to claim 1, wherein the negative electrode material layer has a thickness of 10 nm or more and 50 nm or less.

\* \* \* \* \*